Patented Feb. 14, 1939

2,147,206

UNITED STATES PATENT OFFICE 2,147,206

PROCESS FOR DEPHOSPHORIZING AND DESULPHURIZING STEEL

Robert Paul Lemoine, Paris, France, assignor to Société d'Electrochimie, d'Electrométallurgie et des Acléries Electriques d'Ugine, Paris, France, a corporation of France No Drawing. Application March 11, 1937, Serial No. 130,415. In France March 16, 1936

10 Claims. (Cl. 75—54)

In applicant's co-pending application, Ser. No. 72,449, filed April 2, 1936, is described a process for the dephosphorization and desulphurization of steel, which consists in causing to act upon the steel a mixture of substances comprising as a basis an alkali-metal and an agent which is energetically oxidizing with respect to phosphorus. By said process the basic compounds of the alkali-metals are rendered more stable and less volatile, whereby their action upon the metal is ensured.

The present invention provides another process for dephosphorizing and desulphurizing steel, which process is applicable particularly to steel containing dissolved oxygen and which prevents the volatilization of the basic compounds of the alkali-metals at the high temperature of the molten steel, thereby causing the dephosphorization of the steel and the formation of alkaline phosphates. This process consists in pouring the metal in the liquid state into a ladle while causing to act thereupon a solid mixture comprising at least one basic compound of an alkali-metal and a substance forming with said basic compound a definite compound stable at high temperature, this substance being added in quantity insufficient to saturate the basic compound.

By way of example excellent results are obtained with alumina and titanic acid. Appreciable though less important results are obtained with silica. One may also employ aluminates, titanates, or silicates.

Within the scope of the invention are included mixtures, which, when brought to high temperature in the presence of the steel, would give by chemical reaction both alkaline basic compounds and substances such as $SiO_2$, $TiO_2$, $Al_2O_3$ or their alkaline compounds. By way of example may be mentioned mixtures of carbonate of soda and of aluminum and iron oxide, which would give rise to alumina, or mixtures of ferrotitanium and an oxidizing element which would give rise to titanic acid.

Different methods of carrying out the process may be adopted: for example, to complete the dephosphorization of Thomas steel after overblowing, a mixture such as described may be added in the converter after elimination of the greater part of the slag which floats on the steel, and the converter may be reblown for a short period, for example for ten seconds.

A particularly simple method consists in introducing gradually into a ladle or a receptacle, into which is poured the steel to be dephosphorized and which contains dissolved oxygen, a mixture preferably powdered, cold or hot, of sodium carbonate and alumina or bauxite, or a mixture of sodium carbonate and $TiO_2$ or ilmenite. Such a mixture may be prepared in advance by melting together the various starting materials.

In any case, when the mixture is caused to act on the metal to be treated, there is produced a violent agitation and seething of the bath. After the operation the formation of a slag is observed containing alkaline elements and phosphoric acid and the steel is dephosphorized.

At the same time a desulphurization is obtained and it is very remarkable and surprising to observe that, while experiments on desulphurization of malleable cast iron at a temperature lower than that of the molten steel by a mixture of sodium carbonate and alumina did not give any desulphurization effect, a very good dephosphorization and an accompanying desulphurization of the steel is obtained by causing the same mixture to act upon steel containing dissolved oxygen and a sufficiently considerable quantity of phosphorus.

Likewise a combination may be made of the process forming the subject of the present invention and that which formed the subject of said application No. 72,449, that is to say by causing to act upon the steel mixtures containing at the same time an alkaline basic compound or compounds, an oxidizing element, and an element capable of forming a definite compound with the alkaline basic compound or compounds but added in insufficient quantity to saturate them, such, for example, as mentioned herein, namely, $SiO_2$, $TiO_2$ or $Al_2O_3$. This is to be recommended in the case of the dephosphorization of steel containing little dissolved oxygen. By proceeding thus the advantage over the process of application No. 72,449 is likewise obtained of forming slags more easy to separate from the steel.

*Examples*

1. Overblown Thomas steel
    Dephosphorization of 0.040 to 0.015%
    Desulphurization of 0.030 to 0.022% with,
    per metric ton of steel:
        4,500 gm. of $Na_2CO_3$
        1,000 gm. of bauxite 2. High frequency induction furnace steel
    Dephosphorization of 0.130 to 0.060% with,
    per metric ton of steel:
        6,500 gm. of $Na_2CO_3$
        1,000 gm. of ilmenite
        900 gm. of iron ore In the two examples above the mixture, prepared in advance, was projected into the jet of metal during and in proportion to its pouring.

I claim:

1. Process for simultaneous dephosphorization and desulphurization of steel containing oxygen, which process consists in pouring the metal in the liquid state into a ladle while causing to act thereupon a solid mixture comprising at least one basic compound of an alkali-metal and a substance forming with said basic compound a definite compound stable at high temperature, this substance being added in quantity insufficient to saturate the basic compound.

2. Process for simultaneous dephosphorization and desulphurization of steel containing oxygen, which process consists in pouring the metal in the liquid state into a ladle while causing to act thereupon a solid mixture comprising at least one basic compound of an alkali-metal which at the temperature of the operation gives rise to gaseous evolution and a substance forming with said basic compound a definite compound stable at high temperature, said substance being added in quantity insufficient to saturate the basic compound.

3. Process for simultaneous dephosphorization and desulphurization of steel containing oxygen, which process consists in pouring the metal in the liquid state into a ladle while causing to act thereupon a solid mixture comprising firstly at least one basic compound of an alkali-metal, secondly a substance forming with said basic compound a definite compound stable at high temperature, said substance being added in quantity insufficient to saturate the basic compound, thirdly a certain quantity of an element energetically oxidizing with respect to the phosphorus.

4. Process for dephosphorizing and desulphurizing steel containing oxygen according to claim 1, in which the basic compound of an alkali-metal consists of sodium carbonate.

5. Process for dephosphorizing and desulphurizing steel containing oxygen according to claim 1, in which the substance forming with the basic compound of an alkali-metal a definite compound stable at high temperature consists of alumina.

6. Process for dephosphorizing and desulphurizing steel containing oxygen according to claim 1, in which the substance forming with the basic compound of an alkali-metal a definite compound stable at high temperature consists of titanic acid.

7. Process for dephosphorizing and desulphurizing steel containing oxygen according to claim 1, in which the substance forming with the basic compound of an alkali-metal a definite compound stable at high temperature consists of silica.

8. Process for simultaneous dephosphorization and desulphurization of steel containing oxygen, which process consists in pouring the metal in the liquid state into a ladle while causing to act thereupon a solid mixture comprising with at least one basic compound of an alkali-metal, metallic substances and an oxidizing element, which together give rise to the formation of a substance forming with said basic compound a definite compound stable at high temperature, said substance being formed in quantity insufficient to saturate the basic compound.

9. Process as claimed in claim 1, in which the solid mixture intended to act on this steel is placed in the bottom of the ladle before the metal is poured.

10. Process as claimed in claim 1, in which the solid mixture intended to act on the steel is projected into the jet of metal.

ROBERT PAUL LEMOINE.